(12) United States Patent
Kim et al.

(10) Patent No.: US 11,775,674 B2
(45) Date of Patent: Oct. 3, 2023

(54) APPARATUS AND METHOD FOR RECOMMENDING USER PRIVACY CONTROL

(71) Applicant: Electronics and Telecommunications Research Institute, Daejeon (KR)

(72) Inventors: Seung-Hyun Kim, Daejeon (KR); Seok-Hyun Kim, Daejeon (KR); Soo-Hyung Kim, Daejeon (KR); Young-Sam Kim, Daejeon (KR); Jong-Hyouk Noh, Daejeon (KR); Kwan-Tae Cho, Daejeon (KR); Sang-Rae Cho, Chungcheongbuk-do (KR); Young-Seob Cho, Daejeon (KR); Jin-Man Cho, Daejeon (KR); Jung-Yeon Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 254 days.

(21) Appl. No.: 17/224,578

(22) Filed: Apr. 7, 2021

(65) Prior Publication Data
US 2021/0312086 A1    Oct. 7, 2021

(30) Foreign Application Priority Data
Apr. 7, 2020    (KR) .................... 10-2020-0041915

(51) Int. Cl.
*H04L 29/06*    (2006.01)
*G06F 21/62*    (2013.01)
(Continued)

(52) U.S. Cl.
CPC ........ *G06F 21/6245* (2013.01); *G06F 18/214* (2023.01); *G06F 18/217* (2023.01);
(Continued)

(58) Field of Classification Search
CPC .. G06F 21/6245; G06F 18/217; G06F 18/214; G06F 21/604; G06F 21/6263; G06F 21/6254; H04L 63/102; H04L 63/105
See application file for complete search history.

(56) References Cited

U.S. PATENT DOCUMENTS

| 2011/0125783 A1 | 5/2011 | Whale et al. |
| 2019/0080113 A1 | 3/2019 | Kim et al. |

(Continued)

FOREIGN PATENT DOCUMENTS

| KR | 101590626 B1 | 2/2016 |
| KR | 1020160146150 A | 12/2016 |

(Continued)

*Primary Examiner* — Evans Desrosiers
(74) *Attorney, Agent, or Firm* — William Park & Associates Ltd.

(57) ABSTRACT

Disclosed herein are an apparatus and method for recommending privacy control. A privacy control server includes multiple common privacy control recommendation models learned based on personal information provision histories of multiple users, a user preference determination unit for generating at least one question item based on the multiple common privacy control recommendation models and determining a privacy control preference of a user based on a result of a user answer to the at least one question item, and a common privacy control recommendation model provision unit for providing a common privacy control recommendation model selected to match the privacy control preference of the user to the user.

13 Claims, 7 Drawing Sheets

(51) Int. Cl.
  *G06F 21/60*    (2013.01)
  *H04L 9/40*     (2022.01)
  *G06F 18/214*   (2023.01)
  *G06F 18/21*    (2023.01)

(52) U.S. Cl.
  CPC ........ *G06F 21/604* (2013.01); *G06F 21/6263* (2013.01); *H04L 63/102* (2013.01); *H04L 63/105* (2013.01)

(56) References Cited

U.S. PATENT DOCUMENTS

| | | | |
|---|---|---|---|
| 2019/0108353 A1* | 4/2019 | Sadeh | G06F 21/604 |
| 2020/0134211 A1* | 4/2020 | Miller | H04L 9/088 |
| 2020/0293514 A1* | 9/2020 | Rudek | G06F 21/6245 |

FOREIGN PATENT DOCUMENTS

| | | |
|---|---|---|
| KR | 101868589 B1 | 6/2018 |
| KR | 101881045 B1 | 7/2018 |
| KR | 1020180104586 A | 9/2018 |
| KR | 1020190008163 A | 1/2019 |
| KR | 1020190030023 A | 3/2019 |

\* cited by examiner

APPARATUS AND METHOD FOR RECOMMENDING USER PRIVACY CONTROL

CROSS REFERENCE TO RELATED APPLICATION

This application claims the benefit of Korean Patent Application No. 10-2020-0041915, filed Apr. 7, 2020, which is hereby incorporated by reference in its entirety into this application.

BACKGROUND OF THE INVENTION

1. Technical Field

The present invention relates to an apparatus and method for recommending user privacy control.

2. Description of the Related Art

In an online environment, personal information of a user is collected and managed by a server. The server provides personalized service to the user by utilizing the personal information provided by the user. Also, the server shares the personal information of the user with other servers using an access control protocol such as OAuth, thus reducing the burden of management of the personal information of the user.

However, because the variety of personal information stored in the server is increasing and requests for services provided by the server and requests for personal information by other servers frequently occur, the burden of user privacy control also increases. During this process, it is inconvenient for the user to personally check and process the details of personal information requests. Further, due to the limited user interfaces (UI) of mobile terminals, when the user intends to provide personal information to an application, he or she may make a mistake in determining privacy control. Furthermore, the user's determination of the privacy control is apt to vary with a change in context, and a determination for privacy control differing from an existing privacy control determination may occur even due to psychological changes. This problem is called the "privacy paradox" or "privacy turbulence" in the privacy field. In order to desirably recommend privacy control, there is required a scheme for handling determination in privacy control specialized for each user while continuously coping with those problems.

However, upon recommending privacy control specialized for the user, the following problems may occur.

First, a cold start problem, in which it is not easy to recommend privacy control to an initial subscriber, may arise. The reason for this is that it is possible to recommend privacy control matching a user preference only when the user preference is detected based on a history of provision of the user's personal information that has been accumulated, but, for an initial subscriber, such a personal information provision history has not yet accumulated.

Next, a model update problem may occur in which, in order to reflect the actual history of each user, updating of the entire model is required, but the actual history is not reflected, and thus the accuracy of the recommendation service is deteriorated. Generally, since a recommendation model uses an existing machine-learning technique, a problem may arise in that a previous model must be relearned using all pieces of data used to generate the previous model so as to update the model, which consumes a lot of time and expense. Further, a machine-learning technique generates a recommendation model for classifying responses depending on the frequency of data, and thus a problem may arise in that the history of each user is not reflected in the recommendation model until the frequency of the history of the user exceeds a predetermined frequency.

The above-described background technology is technological information that was possessed by the present applicant to devise the present invention or that was acquired by the present applicant in the process of devising the present invention, and thus such information cannot be construed to be known technology that was open to the public before the filing of the present invention.

PRIOR ART DOCUMENTS

Patent Documents (Patent Document 1) Korean Patent No. 10-1590626

SUMMARY OF THE INVENTION

An embodiment is intended to recommend privacy control that matches a privacy control preference of a subscriber even if the subscriber is an initial subscriber whose personal information provision history is insufficient.

An embodiment is intended to remove the burden on learning and updating a recommendation model that is required until privacy control recommendation is optimized for a user.

In accordance with an aspect, there is provided a privacy control server, including multiple common privacy control recommendation models learned based on personal information provision histories of multiple users, a user preference determination unit for generating at least one question item based on the multiple common privacy control recommendation models and determining a privacy control preference of a user based on a result of a user answer to the at least one question item, and a common privacy control recommendation model provision unit for providing a common privacy control recommendation model selected to match the privacy control preference of the user to the user.

The question item may be a question item for which a difference between results of answers depending on the privacy control preference is equal to or greater than a predetermined value.

The personal information provision histories may be provided and collected from a blockchain network.

In accordance with an aspect, there is provided a user terminal, including a common privacy control recommendation model acquisition unit for acquiring a common privacy control recommendation model matching a result of privacy control preference of a user that is determined based on a result of a user answer to at least one question item, and a privacy control recommendation generation unit for recommending a privacy control as an output of a common privacy control recommendation model that runs in response to a personal information request made to use a service.

The common privacy control recommendation model acquisition unit may output at least one question item received from a privacy control server, provides an interface for inputting a selection signal from the user, and may transmit the input selection signal to the privacy control server.

The user terminal may further include a personal information request processing unit for providing an interface for inputting a privacy control selection from the user, and responding to privacy control based on the privacy control selection input from the user, and a privacy control recommendation model acquisition unit for, when a privacy control selected by the user is not a recommended privacy control, generating an individual privacy control recommendation model that is learned based on privacy control details input from the user.

The individual privacy control recommendation model may be learned through reinforcement learning.

The privacy control recommendation generation unit may be configured to, when an individual privacy control history is present, further run the individual privacy control recommendation model, and correct a privacy control output from the common privacy control recommendation model to an output of the individual privacy control recommendation model.

The personal information request may be delivered from a blockchain network that received the personal information request from a service provider which desires to provide a service to the user.

The personal information request may be transmitted only when a user policy designates that explicit approval of the user is required for use of the personal information of the user as a user policy.

The personal information request processing unit may transmit a privacy control response to a blockchain network, and the privacy control response may be used to allow the blockchain network to process the user personal information and to use the processed user personal information to respond to the personal information request from the service provider under privacy control.

In accordance with an aspect, there is provided a method for recommending privacy control, including acquiring a common privacy control recommendation model matching a privacy control preference of a user that is determined depending on a result of a user answer to at least one question item, and recommending a privacy control as an output of a common privacy control recommendation model that runs in response to a personal information request made to use a service.

The common privacy control recommendation model may be selected to match the privacy control preference of the user, among multiple common privacy control recommendation models learned based on personal information provision histories of multiple users.

The personal information provision histories of the multiple users may be collected from a blockchain network.

The question item may be a question item for which a difference between results of answers depending on the privacy control preference is equal to or greater than a predetermined value.

The method may further include providing an interface for inputting a privacy control selection from the user, and responding to the personal information request based on the privacy control selection input from the user, and when a privacy control selected by the user is not a recommended privacy control, generating an individual privacy control recommendation model that is learned based on privacy control details input from the user.

The individual privacy control recommendation model may be learned through reinforcement learning.

Recommending the privacy control may include, when an individual privacy control history is present, further running the individual privacy control recommendation model, and correcting a privacy control output from the common privacy control recommendation model to an output of the individual privacy control recommendation model.

The personal information request may be delivered from a blockchain network that received the personal information request from a service provider which desires to provide a service to the user The personal information request may be transmitted only when a user policy designates that explicit approval of the user is required for use of the personal information of the user as a user policy.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
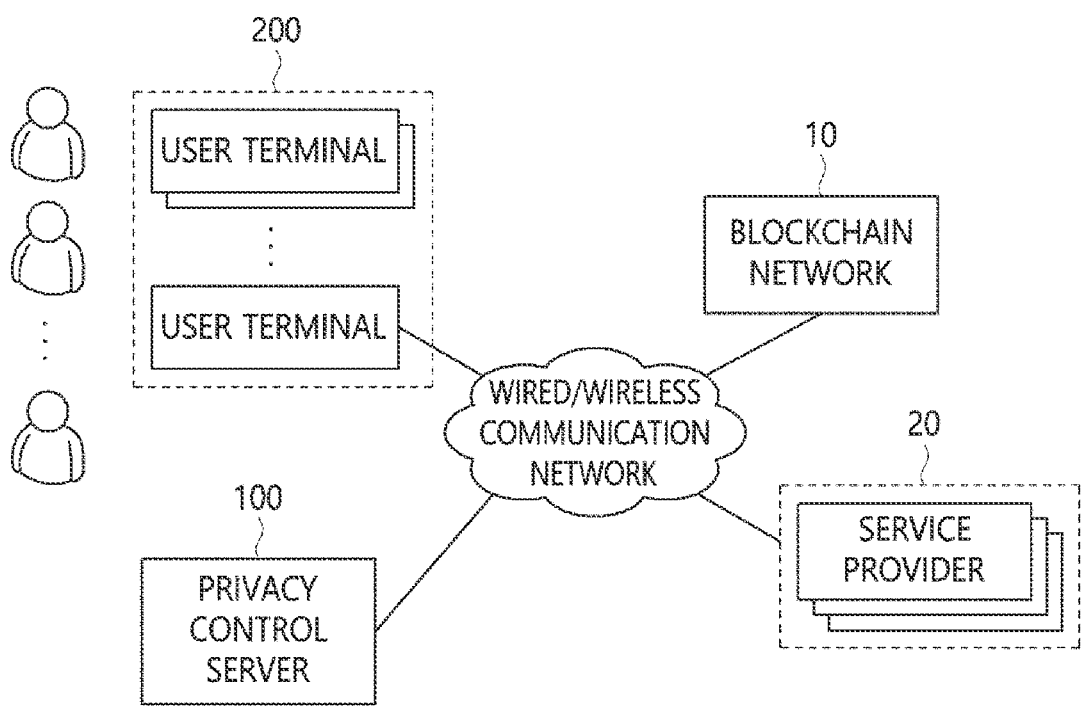
FIG. 1 is a diagram illustrating a privacy management framework in which user privacy control is recommended according to an embodiment.

Embodiments of the present invention are described with reference to the accompanying drawings. It should be noted that the same reference numerals are used to designate the same or similar elements throughout the drawings. It should be noted that the same reference numerals are used to designate the same or similar elements throughout the drawings. In the following description of the present invention, detailed descriptions of known functions and configurations which are deemed to make the gist of the present invention obscure will be omitted.

In the description of components according to embodiments of the present invention, the terms "first", "second", "A", "B", "(a)", and "(b)" may be used. These terms are merely intended to distinguish the corresponding component from other components, and the essence, sequence or order of the corresponding component is not limited by the terms. Further, unless otherwise defined, all terms including technical and scientific terms used herein have the same meanings as those commonly understood by one of ordinary skill in the art to which the present invention pertains. It will be further understood that the terms used herein should be interpreted as having meanings consistent with their meanings in the context of this specification and the relevant art and are not to be interpreted in an idealized or overly formal sense unless expressly so defined herein.

FIG. 1 is a diagram illustrating a privacy management framework in which user privacy control is recommended according to an embodiment.

Referring to FIG. 1, a privacy management framework for recommending user privacy control according to an embodiment of the present invention may be configured in a form in which a privacy control server 100, user terminals 200, a blockchain network 10, and service providers 20 are operated in conjunction with each other over a wired/wireless communication network. Here, the wired/wireless communication network inclusively denotes a wireless Internet communication network such as Wi-Fi or WiBro, a mobile communication network such as Wideband Code Division Multiple Access (WCDMA) or Long-Term Evolution (LTE), a Wireless Access in Vehicular Environment (WAVE) wireless communication network, and a wired Internet communication network.

The blockchain network 10 is connected to the multiple user terminals 200 and stores pieces of personal information and personal information provision histories of multiple users. In an embodiment, when the privacy control server 100 requests the personal information provision histories of the users, stored in the blockchain network 10, the blockchain network 10 may extract the personal information provision histories stored in the storage thereof, and may return the extracted histories to the privacy control server 100. Also, as each service provider 20 requests user personal information stored in the blockchain network 10, the blockchain network 10 may provide the user personal information to the service provider 20. Here, the blockchain network 10 may check a privacy control policy established by the corresponding user. When the privacy control policy designates that explicit approval of the user is required for the use of user personal information, the blockchain network 10 requests the corresponding user terminal 200 to share the personal information. When the user terminal 200 responds to the request, the blockchain network 10 may provide the user personal information to the corresponding service provider 20, or may send a message indicating that the request to provide the user personal information is erroneous, based on received privacy control details.

Each service provider 20 provides personalized service using the user personal information, and may request the personal information of the user, stored in the blockchain network 10, in order to provide the personalized service. Here, the service may be, for example, an application indicating various applications which provide various functions, and the service provider 20 may be a device that provides various types of services through the application. Here, the type of application is not limited, and may have various functions and forms so that the corresponding service may be provided in accordance with various purposes, such as in an account service application (App) of a financial institution, a card payment application, a shopping mall application, and a designated-driver service application. In this case, the application may be installed and run in the form of a program on each user terminal 200, but alternatively may run in the form of a webpage without being installed on the user terminal 200. Here, the application may require various types of personal information related to the user terminal 200 so as to provide designed functions. Here, the requirement for personal information by the application may also be made using a scheme for requesting access authority that enables the personal information stored in the user terminal 200 to be acquired. For example, the application may require location information, address book information, account information, pictures, files, sensor information, etc. as the personal information of the user terminal 200.

The privacy control server 100 may be a communicable computing device that learns privacy policies for collecting the personal information provision histories of users from the blockchain network 10, generates common privacy control recommendation models classified depending on preferences, and provides a common privacy control recommendation model in response to a request received from each user. The detailed configuration of the privacy control server 100 according to an embodiment will be described later with reference to FIGS. 2 and 3.

Each user terminal 200 may be a subject that stores and manages the personal information in the blockchain network 10, and may be a terminal possessed by the corresponding user who uses the service provided by the service provider 20. Here, the user terminal 200 may preferably be, but is not limited to, a mobile terminal such as a smartphone, a wearable device enabling an audio/video call, a tablet PC, or a notebook PC, and may include a wired terminal such as a desktop PC or some other kind of communication device depending on the circumstances. The detailed configuration of the user terminal 200 according to an embodiment will be described later with reference to FIG. 4.

Figure 2:
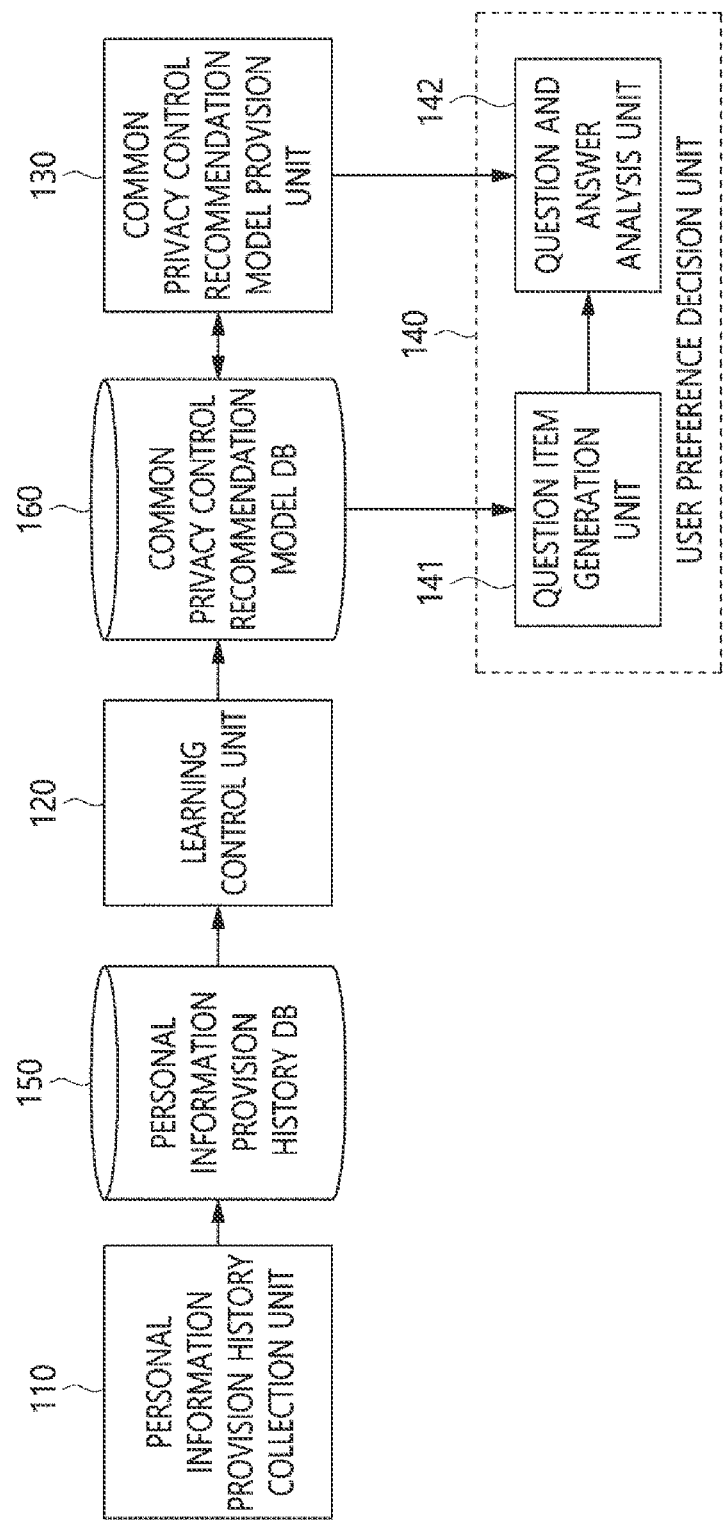
FIG. 2 is a block diagram illustrating the detailed configuration of a privacy control server according to an embodiment.

FIG. 2 is a block diagram illustrating the detailed configuration of a privacy control server according to an embodiment.

Referring to FIG. 2, the privacy control server 100 according to an embodiment may include a personal information provision history collection unit 110, a learning control unit 120, a common privacy control recommendation model provision unit 130, and a user preference decision unit 140. In accordance with an embodiment, the privacy control server 100 may further include a personal information provision history database (DB) 150 and a common privacy control recommendation model DB 160.

The personal information provision history collection unit 110 collects personal information provision histories of multiple users from the blockchain network 10. The personal information provision histories may be stored in the DB 150.

The learning control unit 120 may generate multiple common privacy control recommendation models, which are learned based on the personal information provision histories of the multiple users. Here, the common privacy control recommendation models may be generated based on machine learning by utilizing the personal information provision histories as training data. Here, there may be multiple common privacy control recommendation models, each of which may be learned by each of personal information provision history data sets of the multiple users clustered depending on user preferences. The multiple common privacy control recommendation models may be stored in the DB 160. This will be described in detail below with reference to FIG. 3.

Figure 3:
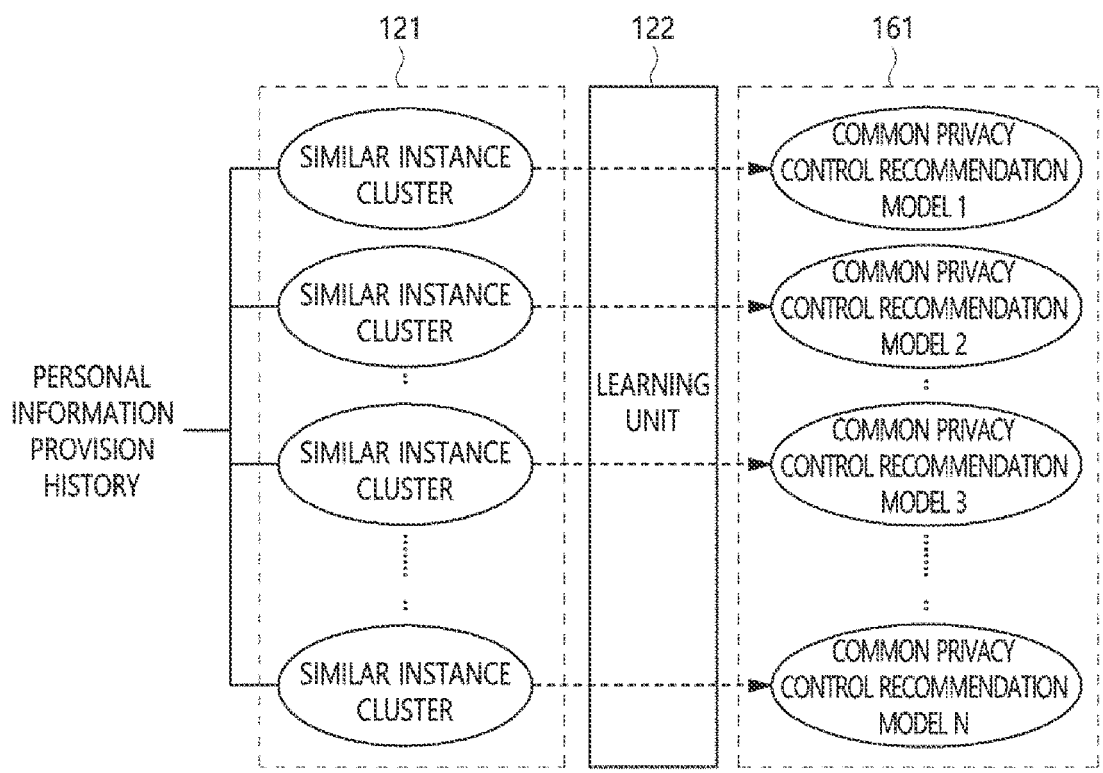
FIG. 3 is a diagram illustrating an example of a learning control unit according to an embodiment.

FIG. 3 is a diagram illustrating an example of a learning control unit according to an embodiment.

Referring to FIG. 3, the learning control unit 120 may include a clustering unit 121 for analyzing personal information provision histories and classifying clusters of similar instances in which a privacy control pattern indicating preference similarities is exhibited, and a learning unit 122 for generating multiple common privacy control recommendation models 161 which are learned using a machine-learning technique by utilizing each of the clusters of similar instances as training data. Here, clustering, Support Vector Machine (SVM), Random Forest (RF), or a Bayesian technique may be utilized as the machine-learning technique. Further, Collaborative Filtering (CF) or the like, which is a recommendation algorithm, may be utilized.

Referring back to FIG. 2, the common privacy control recommendation model provision unit 130 provides a common privacy control recommendation model selected to match the privacy control preference of the user to the corresponding user.

The user preference decision unit 140 may include a question item generation unit 141 and a question and answer analysis unit 142, wherein the question item generation unit 141 generates at least one question item based on the multiple common privacy control recommendation models. Here, the question item is precisely designed to determine the privacy control preference matching the user preference, and is configured by selecting a question item for which the difference between the results of answers depending on the privacy control preference is equal to or greater than a predetermined value. The question and answer analysis unit 142 may determine the preference of user privacy control based on the result of the user answer to at least one question item.

Figure 4:
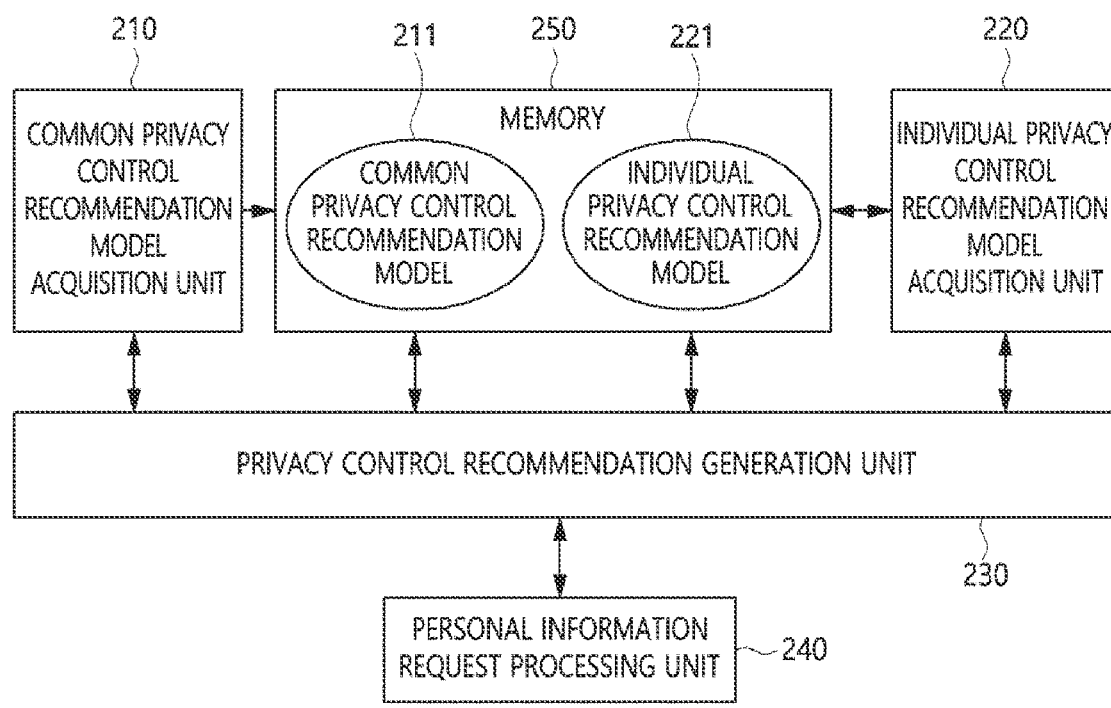
FIG. 4 is a block diagram illustrating the detailed configuration of a user terminal according to an embodiment.

FIG. 4 is a block diagram illustrating the detailed configuration of a user terminal according to an embodiment.

Referring to FIG. 4, the user terminal 200 may include a common privacy control recommendation model acquisition unit 210, an individual privacy control recommendation model acquisition unit 220, and a privacy control recommendation generation unit 230.

The common privacy control recommendation model acquisition unit 210 acquires a common privacy control recommendation model 211 matching the result of the privacy control preference of user that is determined based on the result of the user answer to at least one question item. Here, the common privacy control recommendation model acquisition unit 210 outputs at least one question item received from the privacy control server 100, provides an interface for inputting the selection signal from the user, and generates a user answer to the question item in response to the input selection signal. Thereafter, the common privacy control recommendation model acquisition unit 210 transmits the generated user answer to the question to the privacy control server 100.

The individual privacy control recommendation model acquisition unit 220 generates an individual privacy control recommendation model 221 that is learned based on privacy control details input from the user when the privacy control selected by the user is not a recommended privacy control. Here, the individual privacy control recommendation model 221 may be one that is learned through machine learning by utilizing a privacy control history individually input by the user as training data.

Here, such a machine-learning technique may be reinforcement learning. In particular, Temporal-Difference Learning (TD learning) may be used as a scheme for correcting a past prediction value to more accurately perform prediction on a time-series event, occurring during reinforcement learning, in the future based on current behavior. By utilizing this scheme, a task for updating a privacy control pattern which was executed in the past by the user is performed based on privacy control executed by the user in the current context. Through this task, when user privacy control is changed this time, the change details thereof may be applied to the privacy control pattern, and may be utilized to select privacy control to be subsequently recommended. Accordingly, the privacy control scheme using the existing machine-learning technique may learn a pattern only in the state in which all learning data is prepared, but the present invention may select privacy control to be recommended by forming a privacy control pattern only with learning data that is available up to that time through enforcement learning. Further, whenever learning data is added, a previous privacy control pattern may be updated.

The memory 250 may function to temporarily or permanently store processed data, and may store the common privacy control recommendation model 211 and the individual privacy control recommendation model 221.

The privacy control recommendation generation unit 230 generates a privacy control recommendation as the output of the common privacy control recommendation model, which runs in response to a personal information request made to use the corresponding service. Here, the privacy control recommendation generation unit 230 runs the individual privacy control recommendation model 221 when there is an individual privacy control history. Thereafter, the privacy control recommendation generation unit 230 corrects privacy control that has been output from the common privacy control recommendation model 211 to the output of the individual privacy control recommendation model 221. In this way, personal information may be selectively provided depending on the usage purpose and level of the corresponding service, and thus the privacy control recommendation generation unit 230 may be operated to simultaneously improve the utilization of personalized service by the user and protect the privacy of the user.

The personal information request processing unit 240 provides an interface for inputting the selection of privacy control from the user while displaying details of the privacy control recommendation, and responds to the personal information request based on the privacy control selection input from the user.

Here, the personal information request processing unit 240 selectively performs an operation depending on the result of determining whether the privacy control selected by the user is identical to recommended privacy control, that is, whether the recommendation has been accepted. That is, if it is determined that the recommendation has been accepted, the personal information request processing unit 240 performs recommendation-based privacy control.

Figure 5:
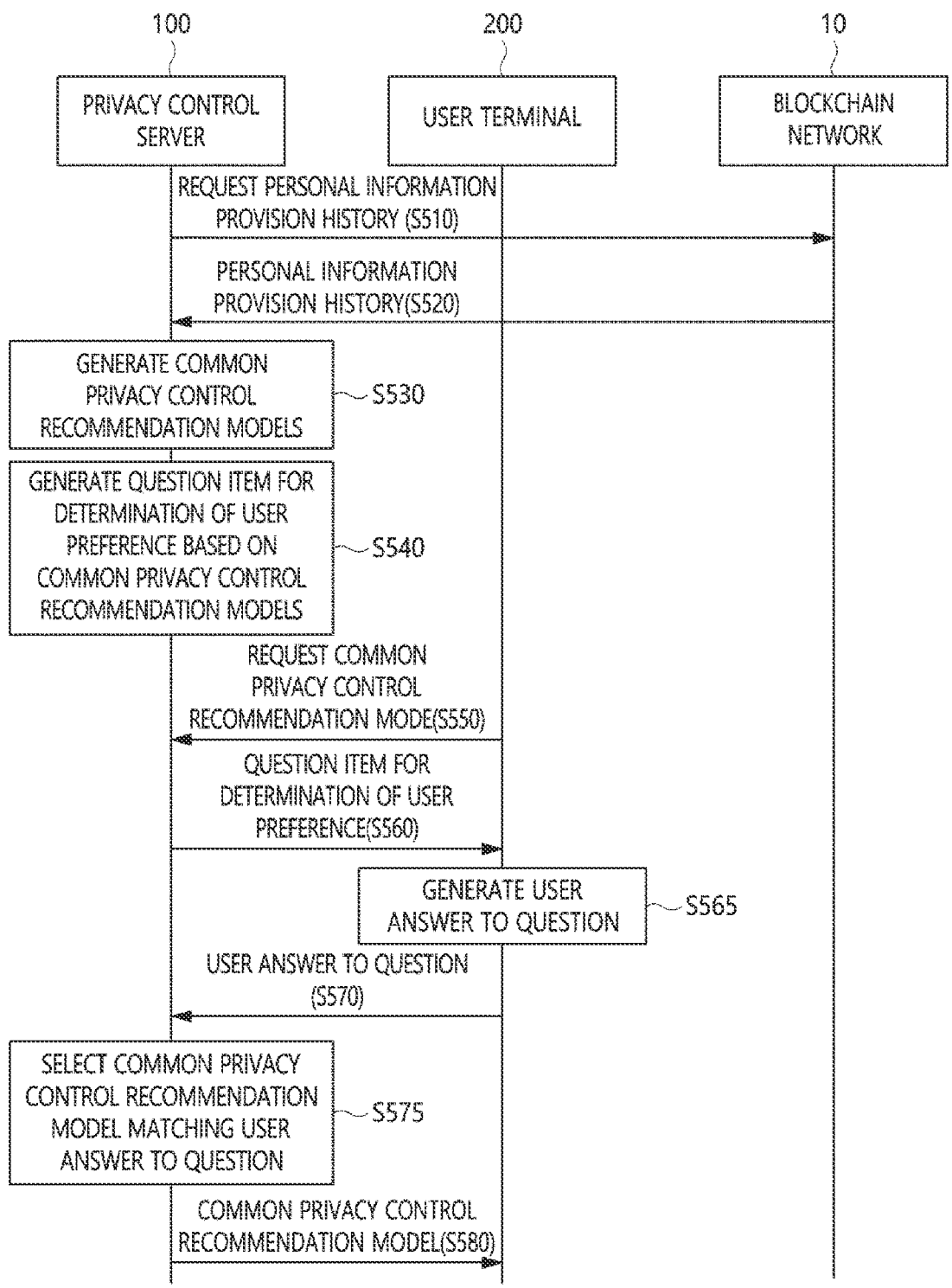
FIGS. 5 and 6 are flowcharts for explaining a method for recommending user privacy control according to an embodiment.

FIG. 5 is a flowchart for explaining a method for recommending user privacy control according to an embodiment. The method for recommending user privacy control illustrated in FIG. 5 may be performed through interworking of the privacy control server 100 of FIG. 1 with a blockchain network 10 and a user terminal 200.

Referring to FIG. 5, when the privacy control server 100 requests personal information provision histories of users stored in the blockchain network 10 at step S510, the blockchain network 10 extracts the personal information provision histories stored in the storage thereof, and returns the extracted histories to the privacy control server 100 at step S520. The privacy control server 100 generates a common privacy control recommendation model that is learned based on the personal information provision histories at step S530. Here, the common privacy control recommendation model may be generated based on machine learning by utilizing the personal information provision histories as training data. Here, there may be multiple common privacy control recommendation models, each of which may be learned by each of personal information provision history data sets of the multiple users clustered depending on user preferences (see FIG. 3).

The privacy control server 100 generates at least one question item based on the multiple common privacy control recommendation models at step S540. Here, the question item is precisely designed to determine the privacy control preference matching the corresponding user preference, and is configured by selecting a question item for which the difference between the results of answers depending on the privacy control preference is equal to or greater than a predetermined value.

Next, when the user terminal 200 requests a common privacy control recommendation model from the privacy control server 100 at step S550, the privacy control server 100 transmits the generated question item to the user terminal 200 at step S560. Then, the user terminal 200 outputs the at least one question item received from the privacy control server 100, provides an interface for inputting the selection signal from the user, and generates a user answer to the question item based on the input selection signal at step S565. Thereafter, the user terminal 200 transmits the generated user answer to the question item to the privacy control server 100 at step S570.

The privacy control server 100 determines the privacy control preference of the user based on the result of the user answer to the at least one question item, and selects a common privacy control recommendation model matching the privacy control preference of the user at step S575.

Thereafter, the privacy control server 100 delivers the selected common privacy control recommendation model to the user terminal 200 at step S580. Then, the user terminal 200 may store the received common privacy control recommendation model, and may utilize the same for privacy control in the future.

Figure 6:
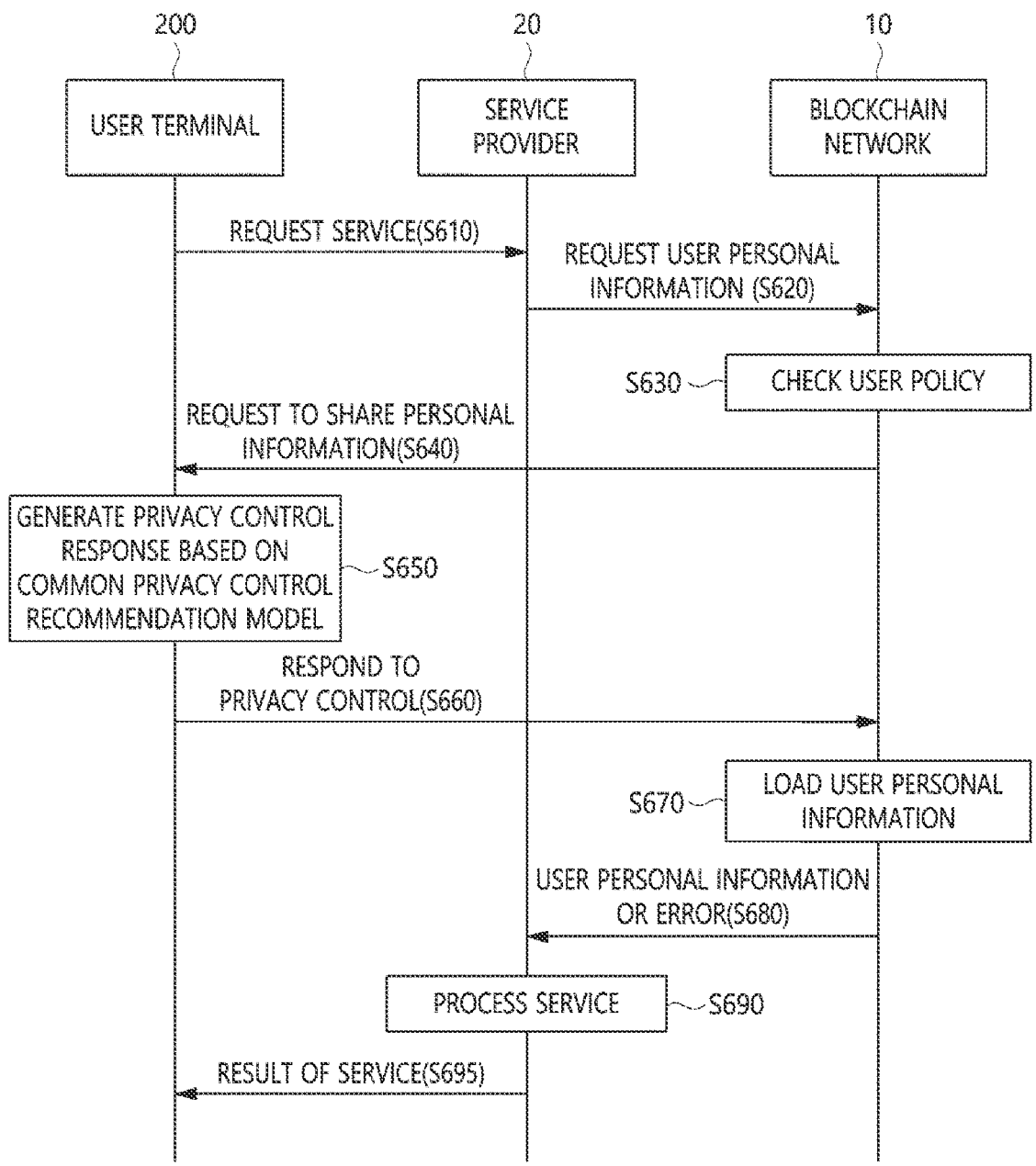

FIG. 6 is a flowchart for explaining a method for recommending user privacy control according to an embodiment. The method for recommending user privacy control illustrated in FIG. 6 may be performed through interworking of the user terminal 200 of FIG. 1 with a blockchain network 10 and a service provider 20.

Referring to FIG. 6, when the user terminal 200 requests a service from the service provider 20 at step S610, the service provider 20 requests user personal information stored in the blockchain network 10 at step S620. The blockchain network 10 checks a user policy established by the corresponding user at step S630. Here, when the user policy designates that explicit approval of the user is required for the use of user personal information, the blockchain network 10 requests the user terminal 200 to share the personal information at step S640.

When the personal information is requested, the user terminal 200 generates a privacy control response based on a previously stored common privacy control recommendation model at step S650. The detailed steps of step S650 will be described later with reference to FIG. 7.

Thereafter, the user terminal 200 responds to the request from the blockchain network 10 as the generated user's privacy control response at step S660, and the blockchain network 10 loads and processes the user personal information under the privacy control at step S670. Here, the blockchain network 10 provides the user personal information to the corresponding service provider 20 or sends a message indicating that the request to provide user personal information is erroneous, under the privacy control at step S680. Thereafter, the service provider 20 processes the service based on the user personal information received from the blockchain network 10 at step S690, and returns the result of the service to the user terminal 200 at step S695.

Figure 7:
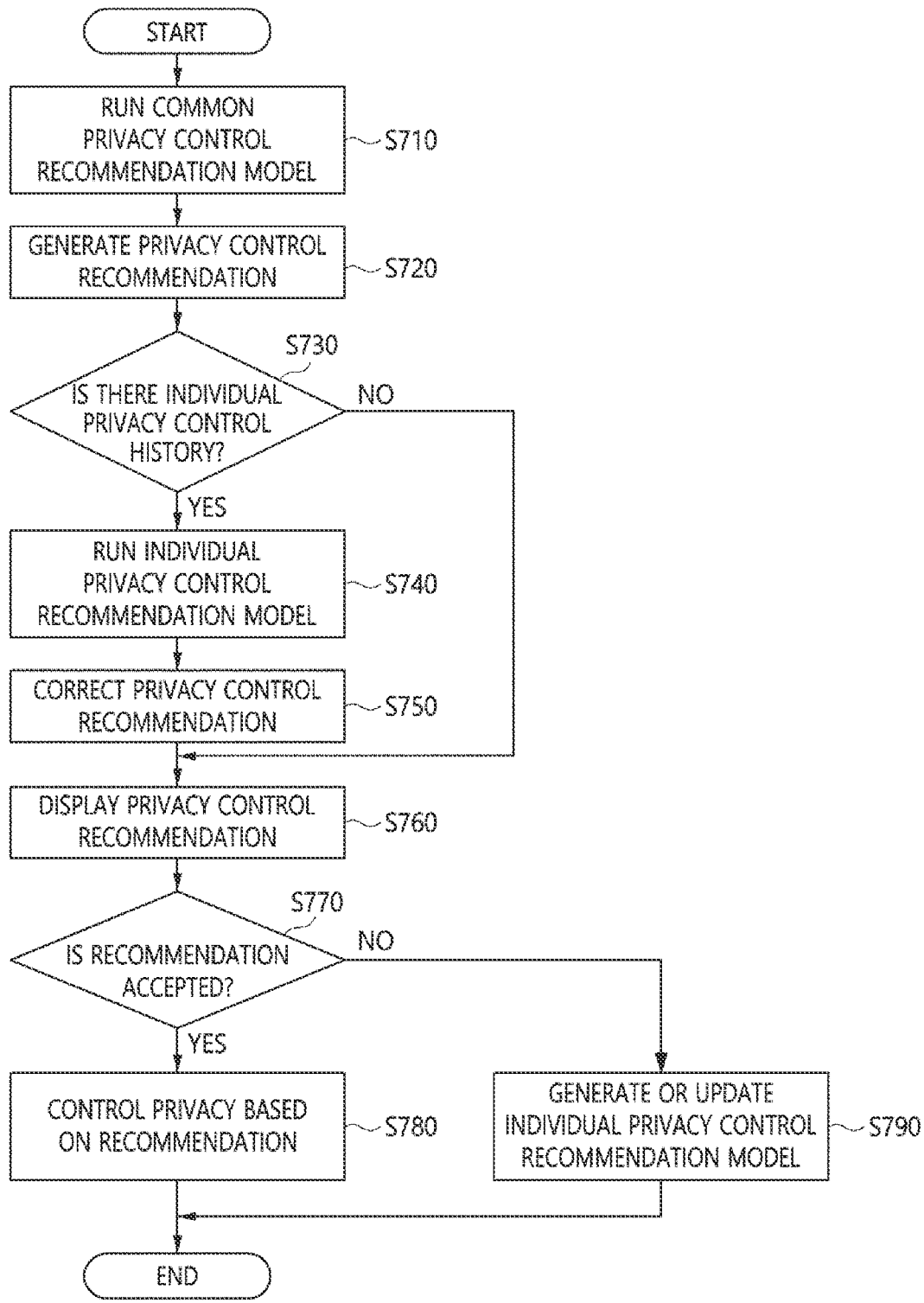
FIG. 7 is a flowchart for explaining the detailed steps of the privacy control response generation step of FIG. 6 according to an embodiment.

FIG. 7 is a flowchart for explaining the detailed steps of the privacy control response generation step S650 of FIG. 6 according to an embodiment.

Referring to FIG. 7, the user terminal 200 runs the common privacy control recommendation model at step S710. The user terminal 200 generates a privacy control recommendation as the output of the common privacy control recommendation model, which receives a personal information request for the use of service, at step S720.

Meanwhile, the user terminal 200 checks whether there is an individual privacy control history at step S730. That is, this operation is intended to determine whether there is a history for individually performing privacy control without the user's acceptance for privacy control recommendation. In this case, because an individual privacy control recommendation model has already been generated, the individual privacy control recommendation model runs at step S740. Thereafter, the user terminal 200 corrects privacy control output from the common privacy control recommendation model to the output of the individual privacy control recommendation model at step S750. In this way, personal information may be selectively provided depending on the usage purpose and the level of the service, and thus the utilization of personalized service for the user may be improved while the privacy of the user may be protected.

Here, the individual privacy control recommendation model may be one that is learned through machine learning by utilizing the privacy control history individually input by the user as training data. Here, the individual privacy control recommendation model may be learned through reinforcement learning. In particular, Temporal-Difference Learning (TD learning) may be used as a scheme for correcting a past prediction value to more accurately perform prediction on a time-series event, occurring during reinforcement learning, in the future based on current behavior. By utilizing this scheme, a task for updating a privacy control pattern which was executed in the past by the user is performed based on privacy control executed by the user in the current context. Through this task, when user privacy control is changed this time, the change details thereof may be applied to the privacy control pattern, and may be utilized to select privacy control to be subsequently recommended.

Meanwhile, although, in FIG. 7, steps S710 to S740 are illustrated as being sequentially performed, this illustration is made for convenience, and the embodiments are not limited thereto. That is, step S730 may be performed first, after which steps S710 and S740 may be selectively or simultaneously performed based on the result of step S730.

Next, the user terminal 200 provides an interface for inputting the selection of privacy control from the user while displaying details of the privacy control recommendation at step S760, and responds to the personal information request based on the privacy control selection input from the user.

That is, the user terminal 200 may determine whether the privacy control selected by the user matches recommended privacy control, that is, whether the recommended privacy control is accepted, at step S770.

If it is determined at step S770 that the recommendation is accepted, the user terminal 200 performs the recommendation-based (i.e., recommended) privacy control at step S780. In contrast, if it is determined at step S770 that the privacy control selected by the user does not match the recommended privacy control, the user terminal 200 generates an individual privacy control recommendation model that is learned based on the privacy control details input by the user at step S790.

The above-described embodiments may be implemented in the form of program instructions that can be executed by various computer means, and may be recorded on a computer-readable storage medium. The computer-readable storage medium may include program instructions, data files, and data structures solely or in combination. The program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

Specific executions described in the present invention are merely embodiments, and are not intended to limit the scope of the invention regardless of the type of method. For simplicity of the specification, descriptions of conventional electronic components, control systems, software, and components in other functional aspects of the systems may be omitted. Further, lines or connection elements for connecting the components illustrated in the drawings exemplarily indicate functional connections and/or physical or circuit-based connections, and may be replaced with other elements or represented by additional various functional connections, physical connections or circuit connections in actual devices. Further, unless a detailed expression such as "essential" or "importantly" is used with regard to a specific component, the corresponding component may not be an essential component required so as to apply the present invention.

In accordance with the present invention, a preset quiz is presented so as to check a privacy control pattern, thus allowing the privacy control preference of a new user to be easily detected and enabling a suitable privacy control recommendation model to be used. By means thereof, the accuracy of privacy control recommendation may be improved, and the burden of inconvenient privacy control and incidence of errors may be reduced.

Further, in accordance with the present invention, interworking with a personalized privacy control model is separately performed, and thus the burden of learning and updating a recommendation model, which are required until privacy control recommendation is optimized for the user, may be eliminated. Further, the time required to update a privacy control recommendation model may be reduced in real time, and the accuracy of the privacy control recommendation model may be improved.

Therefore, the spirit of the present invention should not be limitedly defined by the above-described embodiments, and it is appreciated that the entire range of the accompanying claims, equivalents thereof, and equivalent changes thereof belong to the scope of the spirit of the present invention.

What is claimed is:

1. A privacy control server, comprising:
one or more processors that process computer executable program code embodied in non-transitory computer readable storage media, the computer executable program code comprising:
multiple common privacy control recommendation models learned based on personal information provision histories of multiple users;
user preference decision program code that generates at least one question item based on the multiple common privacy control recommendation models and determines a privacy control preference of a user based on a result of a user answer to the at least one question item; and
common privacy control recommendation model provision program code that provides a common privacy control recommendation model selected to match the privacy control preference of the user to the user,
wherein the personal information provision histories are provided and collected from a blockchain network,
wherein the blockchain network checks a user policy established by the user, and
wherein the question item is a question item for which a difference between results of answers depending on the privacy control preference is equal to or greater than a predetermined value.

2. A user terminal, comprising:
one or more processors that process computer executable program code embodied in non-transitory computer readable storage media, the computer executable program code comprising:
common privacy control recommendation model acquisition program code that acquires a common privacy control recommendation model matching a result of privacy control preference of a user that is determined based on a result of a user answer to at least one question item; and
privacy control recommendation generation program code that recommends a privacy control as an output of a common privacy control recommendation model that runs in response to a personal information request made to use a service,
wherein the personal information request is delivered from a blockchain network that received the personal information request from a service provider which desires to provide a service to the user,
wherein the blockchain network checks a user policy established by the user allowing for the personal information request to be transmitted only when a user policy designates that explicit approval of the user is required for use of the personal information,
wherein the question item is a question item for which a difference between results of answers depending on the privacy control preference is equal to or greater than a predetermined value.

3. The user terminal of claim 2, wherein the common privacy control recommendation model acquisition program code outputs at least one question item received from a privacy control server, provides an interface for inputting a selection signal from the user, and transmits the input selection signal to the privacy control server.

4. The user terminal of claim 2, further comprising:
a personal information request processing program code for providing an interface for inputting a privacy control selection from the user, and responding to privacy control based on the privacy control selection input from the user; and
a privacy control recommendation model acquisition program code for, when a privacy control selected by the user is not a recommended privacy control, generating an individual privacy control recommendation model that is learned based on privacy control details input from the user.

5. The user terminal of claim 4, wherein the individual privacy control recommendation model is learned through reinforcement learning.

6. The user terminal of claim 4, wherein the privacy control recommendation generation program code is configured to:

when an individual privacy control history is present, further run the individual privacy control recommendation model, and correct a privacy control output from the common privacy control recommendation model to an output of the individual privacy control recommendation model.

7. The user terminal of claim 2, wherein:

the personal information request processing program code transmits a privacy control response to the blockchain network, and the privacy control response is used to allow the blockchain network to process the user personal information and to use the processed user personal information to respond to the personal information request from the service provider under privacy control.

8. A method for recommending privacy control, comprising:

processing computer executable program code embodied in non-transitory computer readable storage media by one or more processors, the computer executable program code comprising:

program code that acquires a common privacy control recommendation model matching a privacy control preference of a user that is determined depending on a result of a user answer to at least one question item; and program code that recommends a privacy control as an output of a common privacy control recommendation model that runs in response to a personal information request made to use a service, wherein the personal information provision histories of the multiple users are collected from a blockchain network, and wherein the blockchain network checks a user policy established by the user allowing for the personal information request to be transmitted only when a user policy designates that explicit approval of the user is required for use of the personal information, and wherein the question item is a question item for which a difference between results of answers depending on the privacy control preference is equal to or greater than a predetermined value.

9. The method of claim 8, wherein the common privacy control recommendation model is selected to match the privacy control preference of the user, among multiple common privacy control recommendation models learned based on personal information provision histories of multiple users.

10. The method of claim 8, further comprising:

providing an interface for inputting a privacy control selection from the user, and responding to the personal information request based on the privacy control selection input from the user; and when a privacy control selected by the user is not a recommended privacy control, generating an individual privacy control recommendation model that is learned based on privacy control details input from the user.

11. The method of claim 10, wherein the individual privacy control recommendation model is learned through reinforcement learning.

12. The method of claim 10, wherein recommending the privacy control comprises:

when an individual privacy control history is present, further running the individual privacy control recommendation model; and correcting a privacy control output from the common privacy control recommendation model to an output of the individual privacy control recommendation model.

13. The method of claim 8, wherein the personal information request is delivered from a blockchain network that received the personal information request from a service provider which desires to provide a service to the user.

* * * * *